Figure 1:
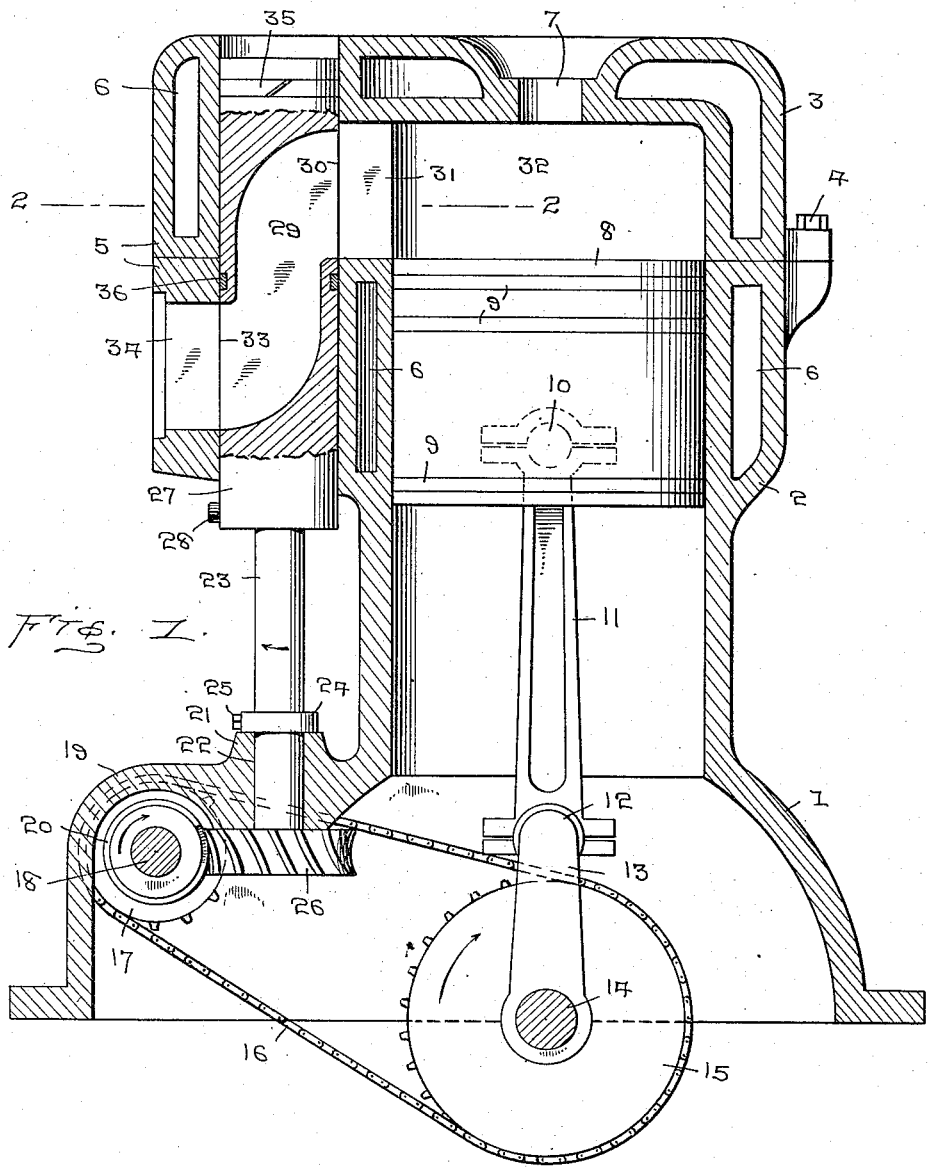

D. B. BUBAR.
ROTARY VALVE FOR EXPLOSIVE ENGINES.
APPLICATION FILED JULY 3, 1914.

1,174,818.

Patented Mar. 7, 1916.
2 SHEETS—SHEET 1.

WITNESSES

INVENTOR
D. B. Bubar
Attorney

D. B. BUBAR.
ROTARY VALVE FOR EXPLOSIVE ENGINES.
APPLICATION FILED JULY 3, 1914.
1,174,818.
Patented Mar. 7, 1916.
2 SHEETS—SHEET 2.
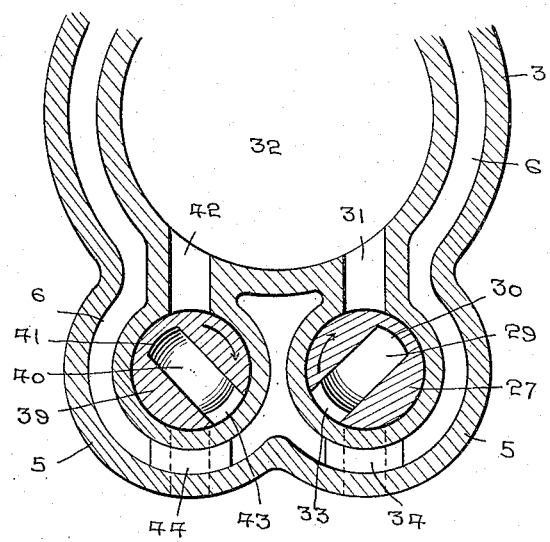
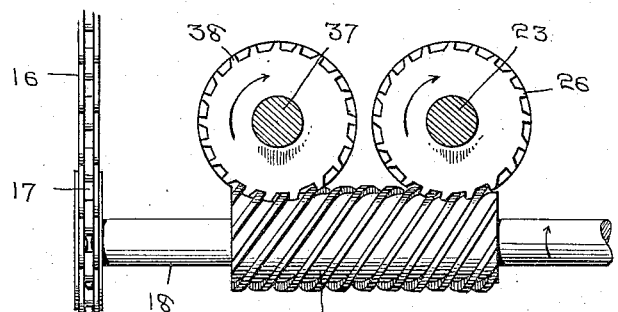
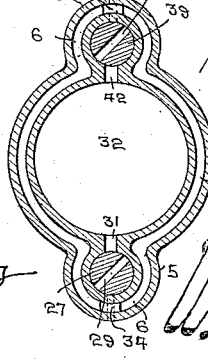
WITNESSES
INVENTOR
D. B. Bubar
Attorney

UNITED STATES PATENT OFFICE.

DEAN B. BUBAR, OF ROSEBURG, OREGON.

ROTARY VALVE FOR EXPLOSIVE-ENGINES.

1,174,818.  Specification of Letters Patent.  Patented Mar. 7, 1916.

Application filed July 3, 1914. Serial No. 848,835.

*To all whom it may concern:*

Be it known that I, DEAN B. BUBAR, a citizen of the United States, residing at Roseburg, in the county of Douglas and State of Oregon, have invented certain new and useful Improvements in Rotary Valves for Explosive-Engines; and I do hereby declare the following to be a full, clear, and exact description of the invention, such as will enable others skilled in the art to which it appertains to make and use the same.

This invention relates to internal combustion engines and more particularly to the four cycle type, and has for one of its objects the provision of independent rotary valves for controlling the respective inlet port and outlet port of the engine.

A further object of this invention resides in the provision of rotary valves for internal combustion engines which are operated by a worm gear driven by a sprocket chain connection with the crank shaft of the engine, thus eliminating the noise and vibration and further dispensing with the necessity of grinding the valves, for by their construction and rotary motion there are no flat surfaces formed upon the valves for the accumulation of carbon that so often interferes with the efficient operation of the valves and thereby causing serious loss of the compressed gas, this being exceedingly detrimental to the smooth running of the engine.

A still further object of this invention resides in the provision of independent inlet and exhaust valves for controlling the respective inlet and exhaust ports of the engine, whereby the alternate excessive heating and extreme chilling of the valves, as in the case when a single valve is required to perform a double function of controlling the inlet and exhaust valves, and the detrimental results therefrom, are wholly obviated, and sticking of the valves due to the sudden expansion and contraction alternately at the opposite ends thereof and the damage occasioned thereby are eliminated. And a still further object of this invention resides in the provision of an independent valve for controlling the respective inlet port and outlet port of a four cycle internal combustion engine, so driven and timed that the respective valves make one revolution to two of the crank shaft of the engine, thus reducing the excessive wear of the valves and prolonging the life of the same. And still another object of this invention resides in the provision of rotary valves for controlling the respective inlet and exhaust ports of a four cycle internal combustion engine, the valves occupying separate casings and each provided with packing rings arranged in a manner for providing air tight fittings for the valves for preventing the escape of gases therearound, the valves, however being of similar construction, the only difference being in the timing of the valves.

These and other objects will more fully appear and the nature of the invention be more clearly understood by the construction and the combination and arrangement of the parts thereof as described in the following specification, defined in the appended claims, and illustrated in the accompanying drawings, in which, Figure 1 is a vertical sectional view of the engine showing the construction and a correlation of the working parts thereof. Fig. 2 is a fragmentary horizontal sectional view on line 2—2 of Fig. 1 showing the mounting of the inlet and exhaust valves and the respective positions relative to each other immediately after the explosion of a fuel charge, the position of the valves varying slightly from that shown in Fig. 1. Fig. 3 is a detail view of the worm gear and sprocket connections for operating the respective valves. Fig. 4, is a horizontal sectional view showing the manner of positioning the respective inlet and exhaust valves diametrically opposite each other upon the engine cylinder.

Referring to the drawings 1 denotes the engine casing having the cylinder 2 arranged thereon and upon the cylinder 2 is mounted the head 3 secured to the cylinder 2 through the medium of the bolts 4 or other suitable securing means, and upon one side of the cylinder 2 and the head 3, as in Fig. 2 or at opposite sides thereof as in Fig. 4, are formed the valve casings 5, the cylinder 2, the head 3, and the valve casings 5 being provided with the water jacket or other suitable cylinder cooling means 6, the head 3 of the cylinder 2 being provided with the spark plug opening 7. Operating within the cylinder 2 is the piston 8 provided with the upper and lower packing rings 9, and pivotally connected as at 10 is the pitman rod 11, journaled or otherwise secured as at 12 to the crank 13 of the crank shaft 14, within the engine casing 1, the crank shaft 14 being suitably journaled within the engine casing 1 in any suitable manner, and upon the crank shaft 14 within the engine casing 1 is suitably secured the sprocket 15 surrounding which is the sprocket chain 16 for connecting the sprocket 17 with the sprocket 15 for the operation of the sprocket 17 by the sprocket 15, the sprocket 17 being suitably secured to the worm shaft 18 revolubly mounted within the extension 19 of the engine casing 1, the worm shaft 18 having arranged thereon the worm 20 and within the upper portion of the extension 19 of the engine casing 1 is arranged a suitable journal 21 provided with the bore 22 through which and revolubly mounted therein is the valve stem 23 provided with the bearing collar 24 adjustably secured upon the valve stem 23 by the set screw 25, the bearing collar 24 being capable of rotation upon the outer bearing surfaces of the journals 21, and upon the lower end of the valve stem 23 within the engine casing 1 is secured the worm gear 26 for meshing with the worm 20 through which connection valve stem 23 is rotated. Arranged upon the upper end of the valve stem 23 is the rotary exhaust valve 27 adjustably secured upon the end of the valve stem 23 by the set screw or bolt 28, the exhaust valve 27 being rotatably mounted in one of the valve casings 5, and has arranged therethrough the S-shaped bore 29, having its upper inlet end 30 adapted to register with the exhaust bore 31 formed in the wall of the combustion chamber 32 and having its lower outlet end 33 adapted to connect simultaneously with the exhaust port 34 formed in the outer wall of one of the valve casings 5, the exhaust valve 27 is further provided with the upper packing ring 35 arranged adjacent the upper end of the exhaust valve 27, and also provided with the packing ring 36 arranged upon the exhaust valve 27 at a point approximately intermediate of its ends, whereby to provide air tight fittings at points above and below the exhaust port 31 for preventing the leakage of the spent gases therearound.

Formed within the extension 19 of the engine casing 1 is another journal similar to the journal 21 having a bore therethrough similar to the bore 22, and through which bore and revolubly mounted therein is the inlet valve stem 37 having arranged thereon a bearing collar similar to the collar 24 and adjustably secured to the inlet stem 37 by a set screw similar to the set screw 25, and secured upon the lower end of the inlet valve stem 37 within the engine casing 1, is the worm gear 38 also meshing with the worm 20 through which connection the inlet valve stem 37 is also revolved, and arranged upon the upper end of the inlet valve stem 37 is the rotary inlet valve 39 adjustably secured thereon through the means of a set screw similar to the set screw 28 of the exhaust valve 27, and also having formed therethrough the S-shaped bore 40 having its upper outlet end 41 adapted to register with the fuel inlet port 42 leading into the combustion chamber 32 of the head 3, and having its lower inlet end 43 adapted to register with the fuel intake port 44, which port is connected with any desirable fuel supply means.

In defining the operation of this invention it will be assumed that the engine is of the four cycle type, and in this instance the respective valves 27 and 39 are so timed with respect to the engine shaft 14 through the worm gearing and sprocket connections that the respective valves 27 and 39 complete one revolution to each two revolutions of the crank shaft 14, the valve ports 29 and 40 being positioned at approximately right angular relation to each other or at an angle of 90 degrees, whereby upon the crank shaft 14 being turned slightly past the upper dead center, the inlet valve 39 through its connections with the crank shaft 14 will be rotated upon its axis until the outlet port 41 registers with the inlet port 42, the inlet port 43 of the valve 39 simultaneously registering with the intake port 44 and upon further movement of the piston 8, a supply of fuel mixture is drawn into the combustion chamber 32, the exhaust valve 27 at this time having been rotated for closing the exhaust port 31, and upon the backward stroke of the piston 8 the fuel charge in the combustion chamber 32 is thereby compressed and the inlet valve 39 at this time has been rotated for completely closing the inlet port 42 and upon the slight further movement of the crank 13 past the upper dead center the spark is fired for exploding the mixture, thereby forcing the piston 8 downwardly, both of the valves 27 and 39 being positioned as to completely close the ports 31 and 42. About the time that the piston 8 begins to return from its lowest position the inlet end 30 of the exhaust valve 29 is brought into registration with the exhaust port 31, the outlet end 33 of the valve 27 being simultaneously in registration with the outer exhaust port 34 whereupon the piston upon its further upward movement forces the spent gases out of the combustion chamber 32 through port 29 of the exhaust valve 27, thus completing the clearance stroke at the fourth cycle of the engine, the same being now in the position for a repetition of the operation as above stated.

By the provision of the wear collars 24 adjustably mounted upon the respective valve stems 23 and 37, the stems are maintained in strict vertical position within their respective journals as well as maintaining the worm gears 26 in accurate and constant mesh with the worm 20 of the worm shaft 18, and by adjustably mounting the valves 27 and 39 upon their respective valve stems 23 and 37 I am enabled to accurately and efficiently adjust the valves with respect to the various ports for maintaining the accurate and smooth running of the engine.

I desire to here state that while I have shown the valves as applied to an internal combustion engine, it is to be understood that I do not limit my valve to this specific application, as the same is equally well adapted for use in connection with steam engines, pumps or other mechanisms wherein a valve is a necessary part for its operation.

While I have here shown and described the preferred form of my invention I hereby reserve the right to make such alterations and variations therein from time to time as I may deem expedient and which will be within the scope of the claims.

What I claim as new, and desire to secure by Letters Patent, is:—

1. In combination with the cylinder of an explosive engine having an inlet port and an exhaust port and a piston, of a valve casing having an inlet valve compartment and an exhaust valve compartment, an inlet port and an exhaust port both of said ports being located below the coöperating ports of the cylinder; two vertically positioned, rotary, cylindrical valves operating in said valve compartment, each of said valves having a packing-ring adjacent the upper end thereof and a second packing-ring adjacent the medial portion of said valve, and a vertical opening therethrough for the purpose of establishing communication between the ports of said cylinder and the ports of said valve casing, the lower end of the said opening through said valve being below the lower packing-ring, the upper end of the said opening being on the diametrically opposite face of the valve and located above the said lower packing ring, said valves being positioned with the said openings at right angles to each other, and being adapted for opening and closing the said ports in said cylinder alternately together with the coöperating ports of the said valve casing, and means to rotate said valve at a ratio of one to two relative to the crank shaft of the said engine.

2. In combination with an explosive engine and the cylinder thereof provided with an inlet port and an exhaust port, of a casing having an inlet valve compartment and an exhaust valve compartment and an inlet port and an exhaust port, both of said ports being located below the coöperating ports of the said cylinder; two vertically positioned, cylindrical rotary valves operating in said valve compartments, each of said valves having a packing-ring adjacent the upper end thereof and a second packing-ring adjacent the medial portion of said valve, and a vertical opening through said valve for establishing communication between the ports of said cylinder and the ports of said valve casing, the lower end of the said opening through said valve being below the lower packing-ring, the upper end of the said opening being on the diametrically opposite face of the valve and located above the said lower packing-ring, said valves being positioned with the said openings at right angles to each other, and are adapted for opening and closing the said ports in said cylinder alternately, together with the coöperating ports of the said valve casing; a worm gear and sprocket connection between said valves and the crank shaft of the engine for revolving said valves at a ratio of one to two relative to the said crank shaft, and means for adjusting said valves for accurate registration with said ports.

In testimony whereof I have signed my name to this specification in the presence of two subscribing witnesses.

DEAN B. BUBAR.

Witnesses:
GEORGE W. YOUNG,
ROY O. YOUNG.

Copies of this patent may be obtained for five cents each, by addressing the "Commissioner of Patents, Washington, D. C."